(12) United States Patent
Ergen

(10) Patent No.: US 10,413,815 B2
(45) Date of Patent: Sep. 17, 2019

(54) FOLDABLE COCKPIT SYSTEM FOR SWIVEL CHAIRS

(71) Applicant: GRIFFON MAKINE VE ELEKTRONIK SANAYI TICARET LIMITED SIRKETI, Ankara (TR)

(72) Inventor: Alper Ergen, Ankara (TR)

( * ) Notice: Subject to any disclaimer, the term of this patent is extended or adjusted under 35 U.S.C. 154(b) by 0 days.

(21) Appl. No.: 16/090,506

(22) PCT Filed: Apr. 3, 2017

(86) PCT No.: PCT/TR2017/050131
§ 371 (c)(1),
(2) Date: Oct. 1, 2018

(87) PCT Pub. No.: WO2017/176231
PCT Pub. Date: Oct. 12, 2017

(65) Prior Publication Data
US 2019/0111337 A1    Apr. 18, 2019

(30) Foreign Application Priority Data
Apr. 7, 2016   (TR) .................... 2016 04535

(51) Int. Cl.
*A63F 13/245*   (2014.01)
*A63F 13/23*    (2014.01)
*A63F 13/235*   (2014.01)
*A47C 7/72*     (2006.01)
*G09B 9/02*     (2006.01)

(52) U.S. Cl.
CPC .............. *A63F 13/245* (2014.09); *A47C 7/72* (2013.01); *A63F 13/23* (2014.09); *A63F 13/235* (2014.09); *G09B 9/02* (2013.01)

(58) Field of Classification Search
CPC ...... A63F 13/245; A63F 13/23; A63F 13/235; A47C 7/72; G09B 9/02
USPC .......................................... 463/37
See application file for complete search history.

(56) References Cited

U.S. PATENT DOCUMENTS

| | | | | |
|---|---|---|---|---|
| 5,431,569 A | * | 7/1995 | Simpkins ................ | G09B 9/02 434/29 |
| 7,662,042 B2 | * | 2/2010 | Oswald ................ | A47C 15/004 463/46 |
| 8,251,452 B2 | * | 8/2012 | Hill ...................... | A47C 15/004 297/380 |
| D670,780 S | * | 11/2012 | Cunningham ............... | D21/828 |
| 8,794,698 B2 | * | 8/2014 | Halsey .................. | A47C 4/286 297/153 |
| 2004/0254020 A1 | * | 12/2004 | Dragusin ................ | A47C 7/72 463/46 |
| 2005/0009611 A1 | * | 1/2005 | Masaya ................... | A63F 13/08 463/46 |
| 2005/0132939 A1 | * | 6/2005 | McClellion ............ | A63F 13/02 108/92 |

* cited by examiner

*Primary Examiner* — Allen Chan

(57) ABSTRACT

A foldable cockpit system has upper and lower control interfaces thereon connected to computers, game consoles and similar devices in a wired/wireless manner. The foldable cockpit system is used for gaming, entertainment, and simulation purposes, and is connected to swivel chairs and occupies no space thanks to the foldable nature thereof.

19 Claims, 7 Drawing Sheets

FOLDABLE COCKPIT SYSTEM FOR SWIVEL CHAIRS

TECHNICAL FIELD

Figure 1:
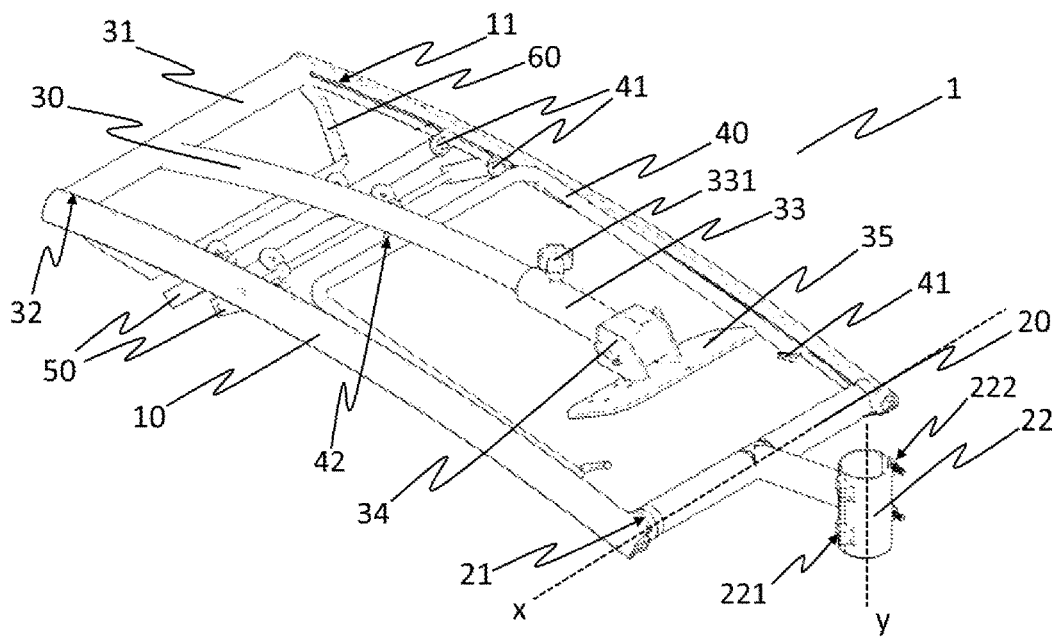

The invention relates to cockpit systems for gaming, entertainment, and simulation purposes which form a control interface by being connected to computers, game consoles and similar devices in a wired/wireless manner.

The invention particularly relates to cockpit systems which are used for gaming, entertainment, and simulation purposes; which form a control interface by being connected to computers, game consoles and similar devices in a wired/wireless manner; and which are attached to swivel chairs and do not occupy any space due to the foldability thereof.

STATE OF THE ART

Today, there exist various control interfaces which are used for drive, flight, and training simulations (driving an automobile; flying a plane, helicopter; driving engineering vehicles, tractors, and such vehicles, etc.) or for gaming and entertainment purposes, in wired/wireless connection with computers, game consoles and similar devices. Some of these form cockpits by being incorporated with such control equipment as steering wheel, gear, pedal, flight stick, keyboard, and mouse. In known applications, the cockpits specially designed in the form of (flight) cabins exist as well as portable, demountable configurations.

The utility model No. CN201867985 registered in China and entitled "Portable foldable auto-driving simulator" discloses exemplary embodiments to the aforementioned portable, demountable configurations. The former and such driving, racing, flight systems etc. may be put aside when they are no longer required to be used. However, they cannot be prevented from occupying large spaces. Furthermore, such foldable systems, which are very few in number, are not steady enough for a stable driving cockpit. In addition to this, the existing foldable systems do not comprise a chair, and so they fail to allow for chair integration and long intervals are created between the system and chair during use.

The systems comprising chairs in itself, on the other hand, eliminate the option of using an available chair, or changing the chair when a different type of chair is required to be used by the user. The systems with chairs are also high in cost since they comprise a chair. Moreover, the systems with chairs typically comprise relatively light chairs lacking the sense of steadiness.

In foldable systems, the number of examples in which the control interfaces (steering wheel, pedal, gear, etc.) connected thereon are also foldable along with the entire system is quite few. These systems do not have a stable configuration as desired, either. The existing systems are not convenient for any use in folded position and they occupy large spaces as mentioned earlier.

As a consequence, the existing need for cockpit systems which are used for gaming, entertainment, and simulation purposes; which form a control interface by being connected to computers, game consoles and similar devices in a wired/wireless manner; and which are attached to swivel chairs and do not occupy any space due to the foldability thereof, as well as the insufficiency of the existing solutions, has deemed it necessary to make a development in the related technical field.

OBJECT OF THE INVENTION

The present invention relates to a foldable cockpit system which meets the aforementioned requirements, eliminates the drawbacks, and at the same time provides additional advantages.

The primary object of the foldable cockpit system according to the invention is to present a stable and steady configuration owing to the ability to be attached to any swivel chair, and to provide advantages in terms of space since its foldable nature allows occupying no space. As the users can use the cockpit system with available swivel chairs, they can also take advantage of the low cost of the system. Further, even when the cockpit system is in folded position, the chair to which it is attached is convenient for use. Thus, it presents a solution allowing use both in folded position and in unfolded position. Almost no loss of space occurs in folded position while in unfolded position, it allows the experience of a real driving cockpit even in a narrow room. Apart from these, it can be easily carried from one place to another in case of being used with a wheeled office chair.

Another object of the invention is to reduce the installation time and labor together with the number of folding operations due to the fact that additional control interfaces within the cockpit system including steering wheel, pedal, gear, etc. can be folded together with the system without having to demount them.

Another object of the invention is to serve as a slide for the foldable components thanks to the channels formed on the horizontal construction. Moreover, the foldable components can be fixed through the desired point, which, in turn, provides advantages in the configuration and allows adjustment according to the user.

Another object of the invention is to facilitate raising the system to the folding position by means of the spring mechanism disposed inside the folding lever, and to prevent it from falling abruptly while being unfolded from the folded vertical position. This, in turn, facilitates mounting and folding processes.

Another object of the invention is to allow an easy demounting and adjustment to the chair leg at varying diameters thanks to the utilization of screw clamp as chair connection means.

Yet another object of the invention is to ensure that the system is no longer in contact with the ground in unfolded position thanks to the foldable legs.

Another object of the invention is to form a basis for connecting the upper control interface arm and upper control interface panel, and ensure the upper control interface including such control means as steering wheel, gear, etc. approaches to the user.

Another object of the invention is to allow adjusting the length of the system by way of a telescopic arm engaged with the upper control interface arm. Thus, the upper control interface may be distanced or approached as desired by the user.

Yet another object of the invention is to form a basis for connecting the lower control interface arms and the lower control interface, including gas, brake controls, etc.

Still another object of the invention is to allow foldability by means of the neck connection through which the upper control interface panel is connected.

And another object of the invention is to comprise thereon such control interfaces as the upper control interface and lower control interface, which are connected to computers, game consoles and similar devices in a wired/wireless manner, and to be utilized for training purposes apart from gaming, entertainment, and simulation purposes.

In order to achieve the aforementioned objects in the most general sense, a foldable cockpit system has been developed which comprises thereon such control interfaces as the upper control interface and lower control interface, which are connected to computers, game consoles and similar devices in a wired/wireless manner; which is used for gaming, entertainment, and simulation purposes; and which is attached to swivel chairs and does not occupy any space owing to the foldable nature thereof. The foldable cockpit system developed herein comprises at least one side construction with linear structure constituting the basic structure; a secondary beam connected to the side construction with a right angle by means of a moveable secondary joint; a primary beam connected to the side construction with a right angle by means of a moveable primary joint; an upper control interface arm with linear structure which is connected to the secondary beam in a fixed manner and on which the upper control interface is located; a clamp which is connected to the primary beam in a fixed manner and permits mounting in the chair leg; a channel formed on the side construction; a lifting arm moving on said channel and connected to the upper control interface arm from the middle portion thereof by means of the moveable arm connection; and at least one lower control interface arm which moves on the channel and on which the lower control interface is located.

The structural and characteristic features and all advantages of the invention will be understood more clearly by referring to the following figures and the detailed description written with reference to these figures; therefore, the figures and the detailed description should be taken into consideration while making an evaluation.

FIGURES FOR A BETTER UNDERSTANDING OF THE INVENTION

The embodiment of the present invention and advantages thereof with the additional components must be considered together with the drawings explained below in order to be fully understood.

FIG. 1: The overall view of the foldable cockpit system according to the invention in folded position.

Figure 2:
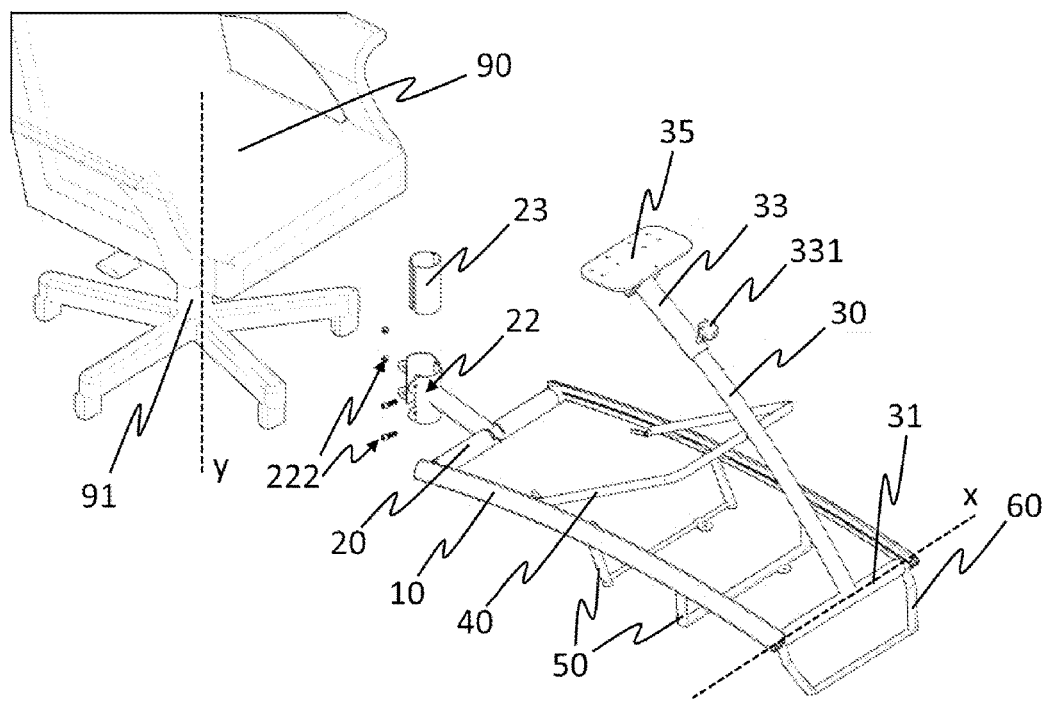

FIG. 2: The overall view of the foldable cockpit system according to the invention in unfolded position.

Figure 3:
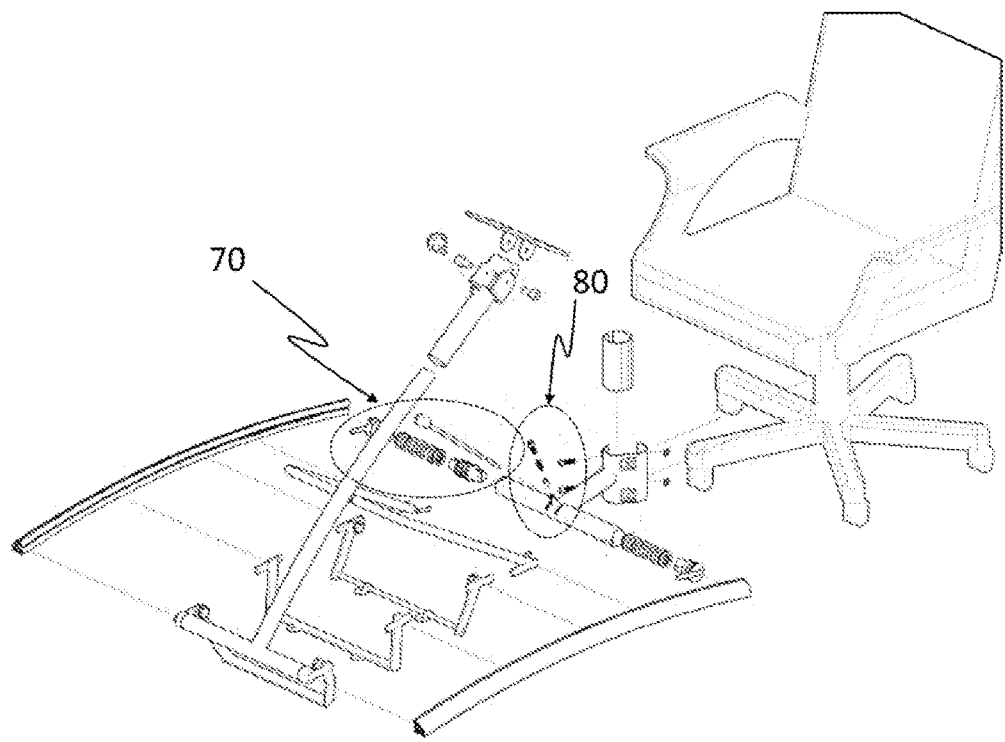

FIG. 3: The dismounted view of the foldable cockpit system according to the invention.

Figure 4A:
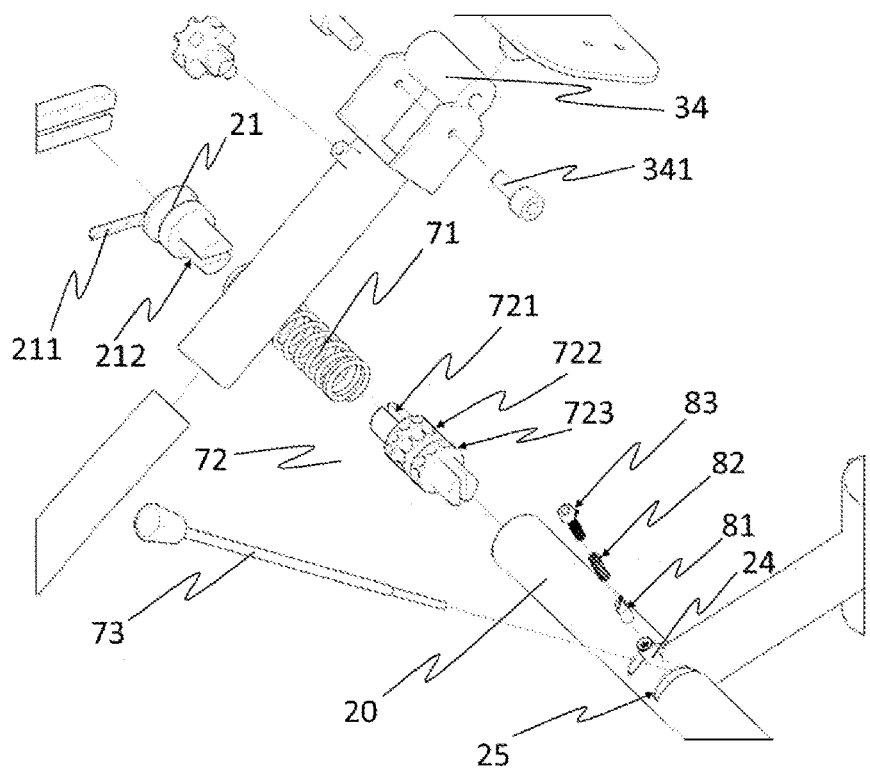

FIG. 4a: The dismounted view of the spring and locking mechanisms disposed in the foldable cockpit system according to the invention.

Figure 4B:
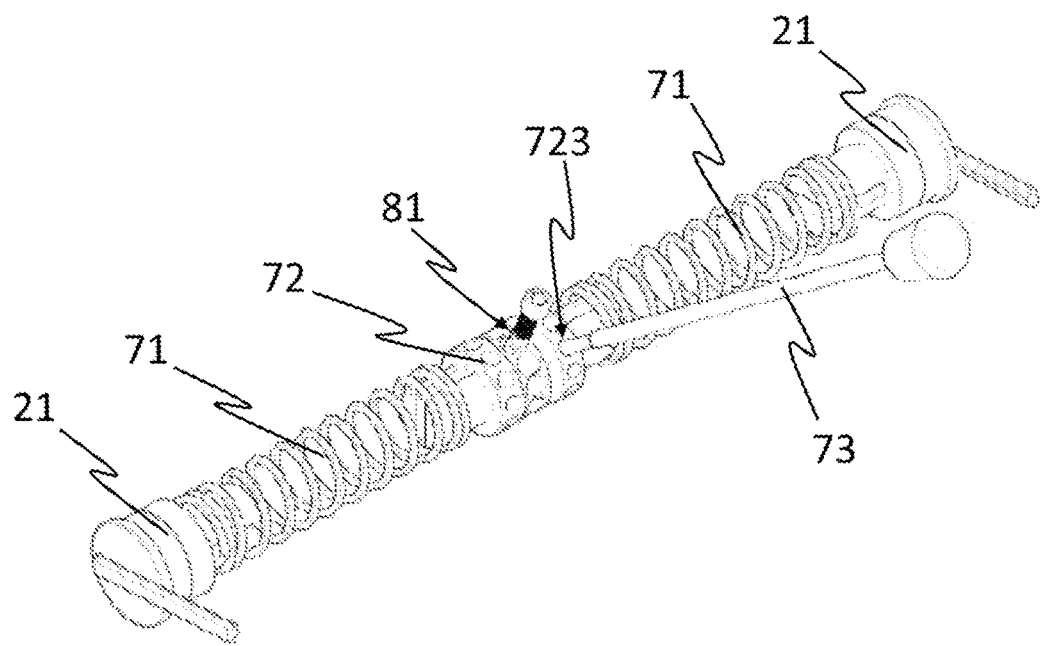

FIG. 4b: The mounted view of the spring and locking mechanisms disposed in the foldable cockpit system according to the invention.

Figure 5:
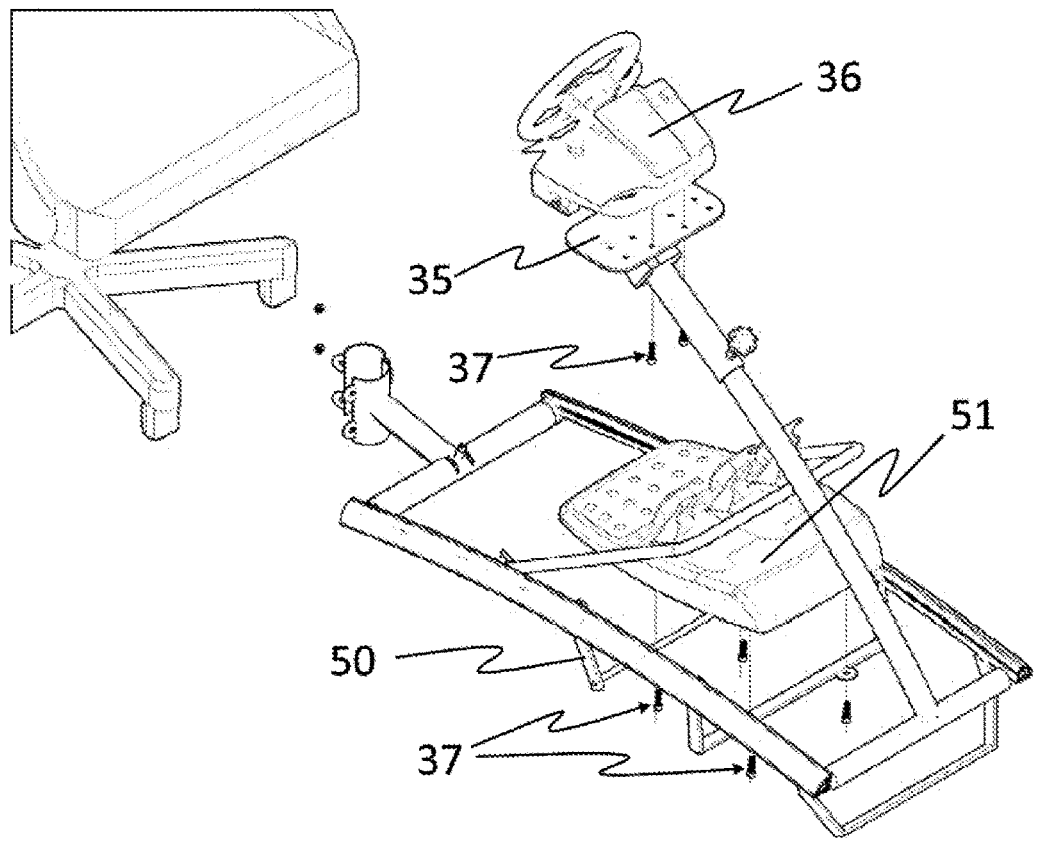

FIG. 5: The overall view of the foldable cockpit system according to the invention in unfolded position when the control interfaces are not yet attached.

Figure 6A:
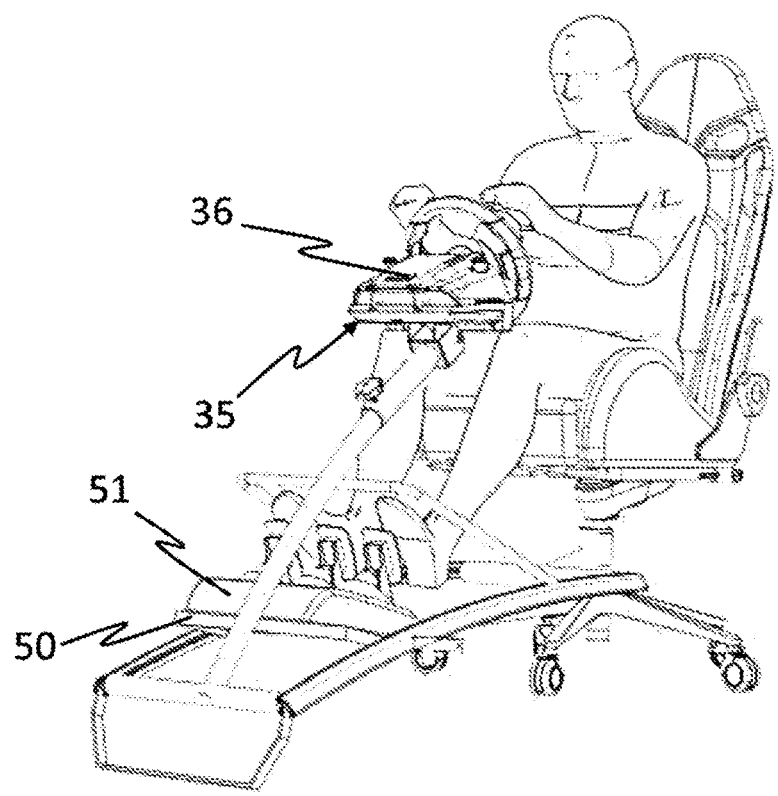

FIG. 6a: The perspective view of the foldable cockpit system according to the invention in unfolded position and during use when the control interfaces are connected thereon.

Figure 6B:
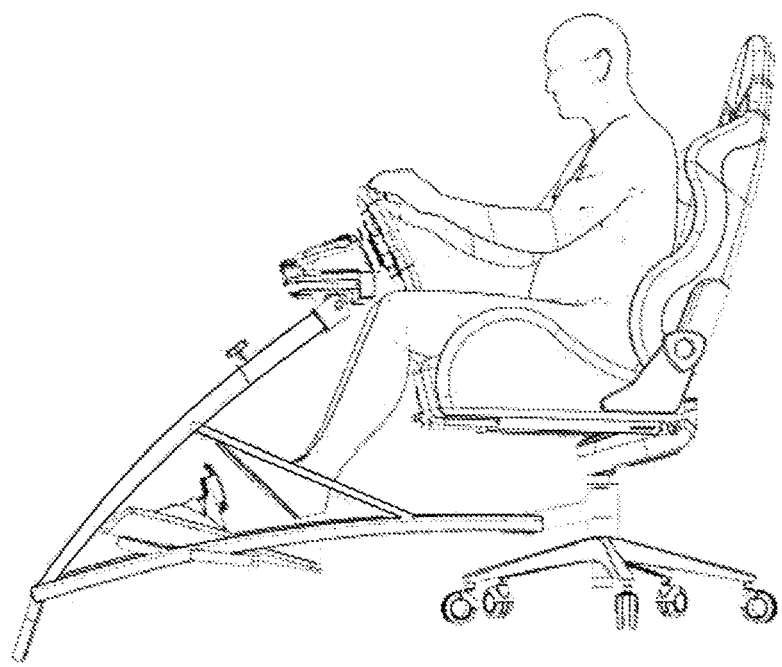

FIG. 6b: The side view of the foldable cockpit system according to the invention in unfolded position and during use when the control interfaces are connected thereon.

Figure 7A:
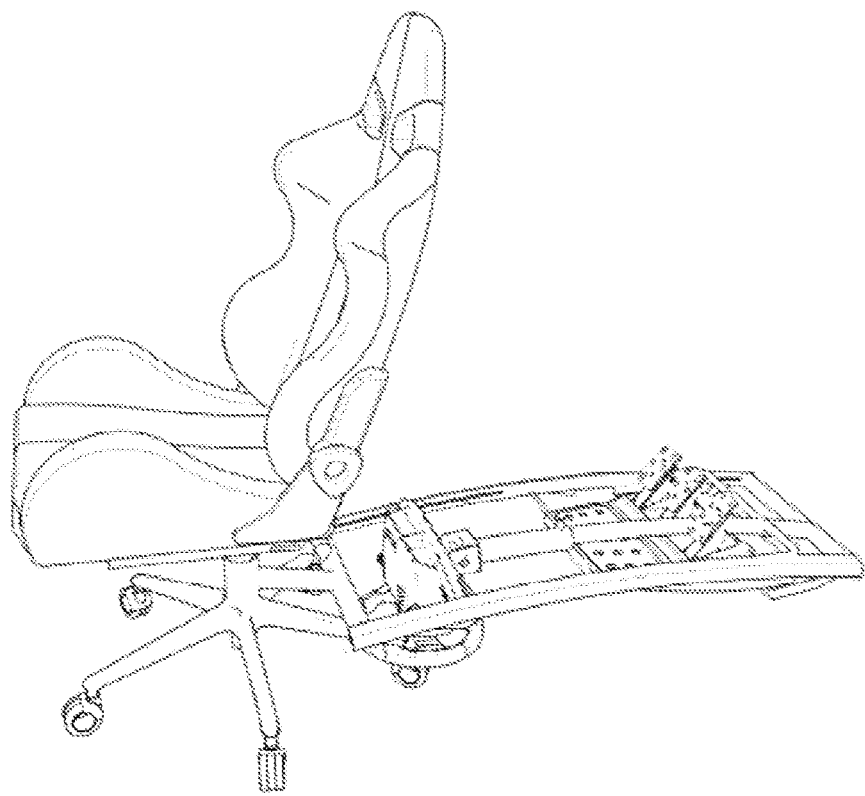

FIG. 7a: The overall view of the foldable cockpit system according to the invention in folded position and when attached to the chair horizontally.

Figure 7B:
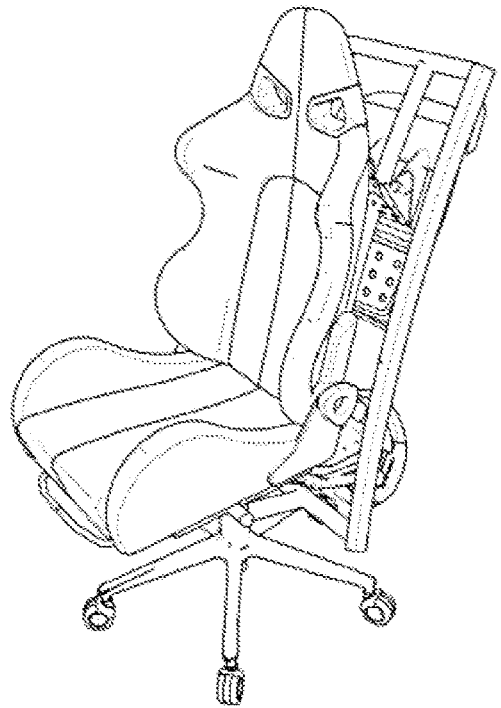

FIG. 7b: The overall view of the foldable cockpit system according to the invention in folded position and when attached to the chair vertically.

Figure 7C:
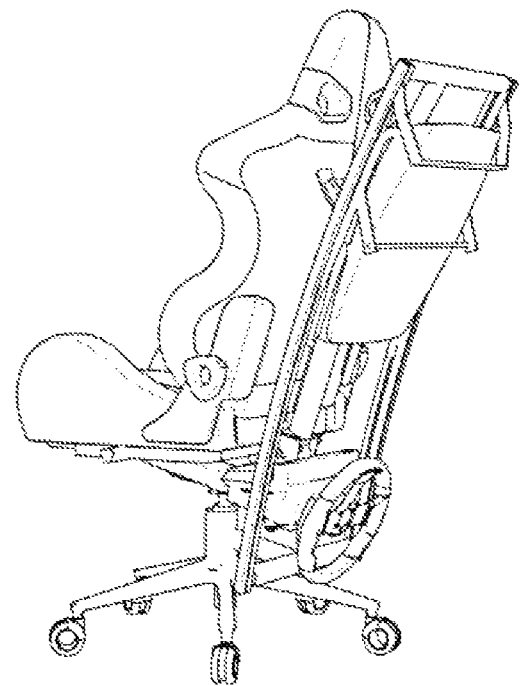

FIG. 7c: The rear view of the foldable cockpit system according to the invention in folded position and when attached to the chair vertically.

Figure 7D:
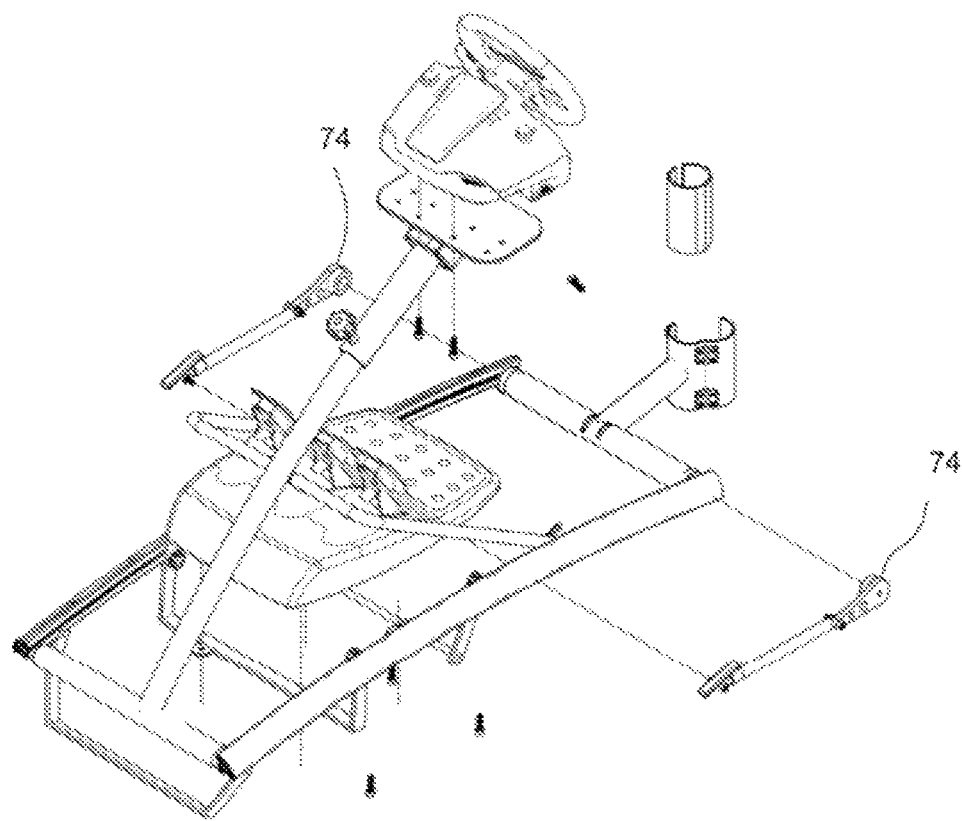

FIG. 7d: The overall perspective view of the alternative embodiment of the foldable cockpit system according to the invention in which dampers are used in a way to eliminate the requirement of using tension springs.

Figure 7E:
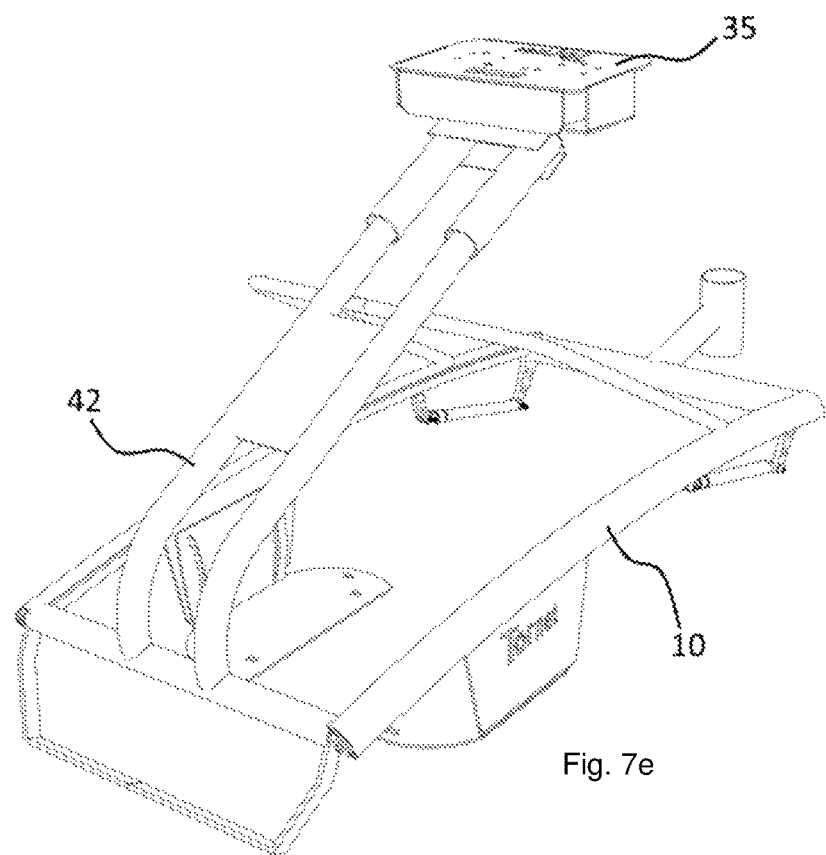

FIG. 7e: The overall perspective view of the double-arm alternative embodiment of the foldable cockpit system according to the invention.

Figure 7F:
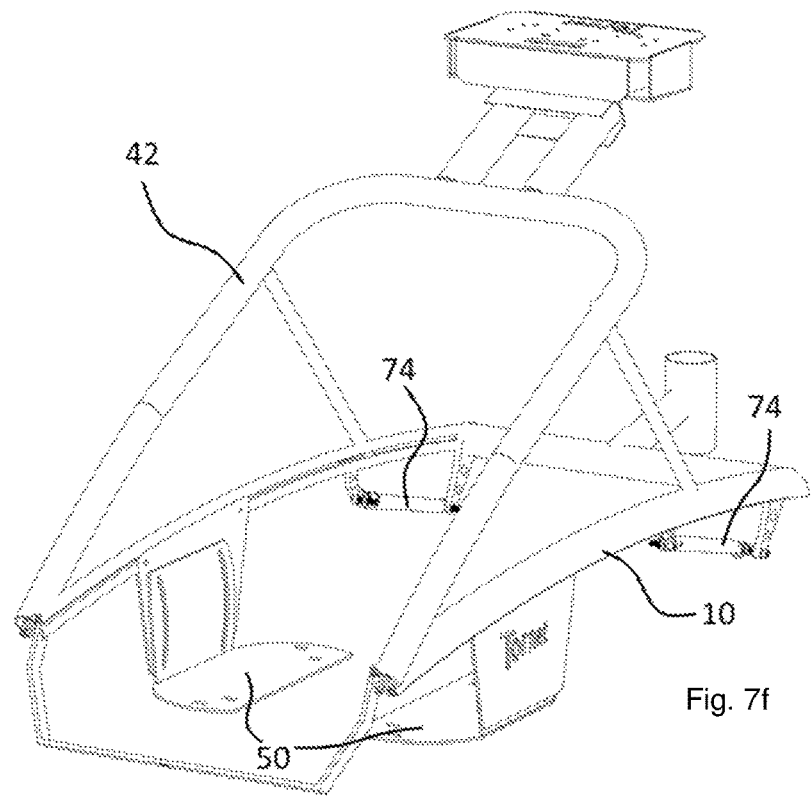

FIG. 7f: The overall perspective view of another alternative double-arm embodiment of the foldable cockpit system according to the invention.

The drawings do not necessarily need to be scaled and the details that are not required for understanding the invention may have been omitted. Apart from that, the elements that are at least substantially identical or have at least substantially identical functions are referred with the same reference numeral.

DESCRIPTION OF PART REFERENCES

1 Foldable cockpit system
10 Side construction
11 Channel
20 Primary beam
21 Primary joint
211 Joint pin
212 Joint spring groove
22 Clamp
221 Hinge
222 Screw and nut
23 Buffer
24 Lock Housing
25 Tensioning guide
30 Upper control interface arm
31 Secondary beam
32 Secondary joint
37 Connecting screw
40 Lifting arm
41 Fixing latches
42 Arm connection
50 Lower control interface arm
51 Lower control interface
60 Stand
70 Spring mechanism
71 Spring
72 Tensioning mechanism
721 Tension spring groove
722 Locking hole
723 Tensioning hole
73 Tensioning arm
74 Dampers
80 Locking mechanism

DETAILED DESCRIPTION OF THE INVENTION

The foldable cockpit system (1) which has been developed for comprising thereon such control interfaces as the upper control interface (36) and lower control interface (51), said control interfaces being connected to computers, game consoles and similar devices in a wired/wireless manner; for being used for gaming, entertainment, and simulation purposes; for being connected to swivel chairs (90) and occupying no space thanks to the foldable nature thereof. The foldable cockpit system (1) is characterized by comprising at least one side construction (10) with linear structure constituting the basic structure; a secondary beam (31) connected to said side construction (10) with a right angle by means of a moveable secondary joint (32); a primary beam (20) connected to said side construction (10) with a right angle by means of a moveable primary joint (21); an upper control interface arm (30) with linear structure which is connected to said secondary beam (31) in a fixed manner and on which the upper control interface (36) is located; a clamp (22) which is connected to said primary beam (20) in a fixed manner and permits mounting in the chair leg (91); a channel (11) formed on said side construction (10); a lifting arm (40) moving on said channel (11) and connected to the upper control interface arm (30) from the middle portion thereof by means of the moveable arm connection (42); and at least one lower control interface arm (50) which moves on said channel (11) and on which the lower control interface (51) is located.

FIGS. 1 and 2 show the overall views of the foldable cockpit system according to the invention (1) in folded and unfolded positions, respectively. The side constructions (10), which are preferably two in number, are positioned in parallel to one another. The side constructions (10) are engaged with the primary beam (20) and secondary beam (31), thereby presenting a rectangular form. The primary beam (20) and the secondary beam (31) are capable of performing free rotation around the primary joint (21) and the secondary joint (32), respectively. The upper control interface arm (30) connected to the secondary beam (31) in a fixed manner is engaged with the lifting arm (40) from the middle portion thereof by means of the moveable arm connection (42). The lifting arm (40) may as well move on the channel (11) by being fitted in the channel (11). As the lifting arm (40) moves away from the secondary beam (31) on the channel (11), it rotates the upper control interface arm (30) around the secondary beam (31) in x axis (x), thereby brings closer the upper control interface arm (30) to the side constructions (10). In reverse movement, the upper control interface arm (30) is lifted upwards with respect to y axis (y). The clamp (22), which permits mounting in the chair leg (91), is connected to the primary beam (20) in a fixed manner and rotational movement in x axis (x) makes the side constructions (10) parallel to the y axis (y) crossing the middle portion of the clamp (22). These two properties provide the system with basic folding characteristics. The lower control interface arms (50) are preferably two in number and are located between and capable of moving inside the channels (11).

The stand (60) is preferably connected to the secondary joints (32) in a moveable manner and when in unfolded position, it ensures that the side construction (10) is no longer in contact with the ground. The clamp (22), which preferably consists of two parts interconnected by means of two hinges (221), is made into an entire ring by connecting through screws and nuts (222). Such configuration permits holding on to chair legs (91). The buffer (23), preferably made of teflon, gets between the clamp (22) and the chair leg (91) while the former is being connected to the latter, thereby preventing any damage thereto. The telescopic arm (33) is engaged with the upper control interface arm (30) telescopically, and thus allowing the length thereof to be adjusted. The clamping screw (331) enables the telescopic arm (33) to be secured on the upper control interface arm (30). The upper control interface panel (35) in which the upper control interface (36) is located is preferably connected to the telescopic arm (33) or in alternative embodiments to the upper control interface arm (30) in both by way of the neck (34). The distinct characteristic of the neck (34) is that it is moveable and allows the adjustment of the upper control interface panel (35). The fixing screw (341) permits the neck (34) to be fixed. The positions of the lower control interface arm (50) and the lifting arm (40) within the channel (11) are fixed by means of the fixing latches (41).

FIG. 3 shows the dismounted view of the foldable cockpit system (1). The spring mechanism (70) is located within the inner section of the primary beam (20) and tensioned with the rotational movement of the side construction (10) with respect to the primary beam (20), thereby facilitating movement by returning its potential energy in the reverse movement thereof. FIGS. 4a and 4b respectively show the dismounted and mounted states of the spring mechanism (70) and locking mechanism (80) disposed in the foldable cockpit system (1). The joint pin (211) formed on the primary joint (21) fits in the channel (11) and ensures the fixation thereof. The joint spring groove (212) formed on the primary joint (21) is the component which is arranged in the spring mechanism (70) and into which the spring (71) performs the functions including tensioning, storing and returning the potential energy, is introduced and fixed therein. The other end of the spring (71) fits in the tensioning mechanism (72), which mediates tensioning of the spring (71) through the tension spring groove (721). The cylindrical tensioning mechanism (72) is located between two springs (71) in the midst of the primary beam (20). When the tensioning mechanism (72) rotates in x axis (x), it draws the springs (71) in connection, thereby being loaded with potential energy. It is the tensioning arm (73) which performs the task of rotating the tensioning mechanism (72) and it is introduced into the tensioning hole (723) formed on the tensioning mechanism (72). The linear tensioning guide (25) disposed on the primary beam (20) ensures that the tensioning arm (73) reaches the beam (20). The locking mechanism (80) serves for locking the tensioning mechanism (72). The locking mechanism (80) consists of a locking pin (81) which fits in and locks the tensioning mechanism (72) by passing through the locking hole (722) formed thereon, a lock spring (82) which ensures that the locking pin (81) remains in its original position, and a locking screw (83) which forms a basis for the lock spring (82), said locking mechanism being located in the lock housing (24) formed on the primary beam (20).

FIG. 7d shows the overall perspective view of the alternative embodiment of the foldable cockpit system (1) according to the invention in which dampers (74) are used in a way to eliminate the requirement of using tension springs. Said dampers (74), specially manufactured for the intended purpose, present another design enabling the foldable cockpit system (1) to be folded safely. It is thus possible to reduce the load of the cockpit system (1) during unfolding from the folded position towards the ground, and to perform said unfolding operation readily. After use, the system is easily raised by the help of the dampers (74) during upward folding operation and is kept safely in folded position unless desired to be unfolded again. Thanks to this special design, a very practical system has been provided both in technical and aesthetical aspects.

Operating Principle of the Spring Mechanism (70) and the Locking Mechanism (80):

The springs (71) are not tensioned normally, but in connection with the tensioning mechanism (72). In the meantime, the locking pin (81) is present in the locking hole (722) and transfers the rotational movement of the primary beam (20) in x axis (x) to the tensioning mechanism (72). The rotational movement of the tensioning mechanism (72), however, draws the springs (71). In normal position, when additional drawing is required without rotating the primary beam (20), the tensioning arm (73) is passed through the tensioning guide (25) and attached to the tensioning hole (723). When the tensioning arm (73) being moved along the tensioning guide (25) is conveyed in upward direction, it draws the springs (71) by rotating the tensioning mechanism (72). The locking pin (81) prevents the tensioning mechanism (72) from being retracted.

FIG. 5 shows the overall view of the foldable cockpit system (1) in unfolded position when the upper control interface (36) and the lower control interface (51) are not yet attached. The connecting screws (37) serve for connecting the upper control interface (36) to the upper control interface panel (35) and the lower control interface arm (50) of the lower control interface (51).

Installation:

FIGS. 6a and 6b show the perspective and side views, respectively, of the foldable cockpit system (1) in unfolded position and during use, when the upper control interface (36) and the lower control interface (51) are connected thereon. During installation of the foldable cockpit system (1), which is presented to the user in folded state, first the buffer (23) is wound around the chair leg (91) and connected thereon by means of the clamp (22), nuts and screws (222). Afterwards, the following steps, the order of which is changeable, are performed:

the lifting arm (40) is moved inside the channels (11), and thus the upper control interface arm (30) is raised, and the lifting arm (40) is fixed via fixing latches (41), the neck (34) is moved and the upper control interface panel (35) is made to assume the desired position and fixed therein by tightening the neck fixing screw (341), the telescopic arm (33) is adjusted according to the user and fixed by means of the clamping screw (331), the lower control interface arms (50) are slid and positioned on the channels (11), and then fixed using the fixing latches (41), and the stand (60) is lowered and the side construction (10) becomes no longer in contact with the ground.

Once these operations are performed, the foldable cockpit system (1) becomes ready to use. It may be used subsequent to making wired or wireless connections. While lifting the foldable cockpit system (1), the operations described above are repeated in reverse order and the foldable cockpit system (1) is folded as shown in FIG. 7a. Subsequently, the tensioning arm (73) is introduced into the tensioning hole (723) and moved several times in a single direction in the tensioning guide (25) according to the desired level of tensioning. Thus the drawn springs (71) facilitates the rotation of the side constructions (10) on the primary beam (20) around the x axis (x). Meanwhile, the chair (90) is preferably such that it will be rotated around the y axis (y) and its rear side will face the foldable cockpit system (1). FIGS. 7b and 7c respectively show the overall and rear views of the foldable cockpit system (1) in folded position and when vertically attached to the chair (90). The spring mechanism (70) prevents the side constructions (10) from falling, i.e. rotating on the primary beam (20). The foldable cockpit system (1) may be directly attached to the backrest of the chair (90) with a view to make it steadier.

The invention claimed is:

1. A foldable cockpit system which comprises thereon such control interfaces as an upper control interface and a lower control interface, said control interfaces being connected to computers, game consoles and similar devices in a wired/wireless manner; which is used for gaming, entertainment, training, and simulation purposes; and which is attached to a swivel chairs and does not occupy any space owing to the foldable nature thereof, characterized in comprising:

at least one side construction constituting a basic structure, a secondary beam engaged with the at least one side construction by a moveable secondary joint, a primary beam fixed in the side construction by the moveable primary joint, an upper control interface arm which is engaged with the secondary beam in a fixed manner and on which the upper control interface is located, a clamp which is connected to the primary beam in a fixed manner and permits mounting in the chair leg, a channel formed on the side construction, a lifting arm moving on the channel and connected to the upper control interface arm from the middle portion thereof by means of the moveable arm connection, and at least one lower control interface arm which moves on said channel and on which the lower control interface is located.

2. The foldable cockpit system as defined in claim 1, characterized in comprising a spring mechanism which is located on said primary beam and drawn with the rotational movement of the side construction with respect to the primary beam and returns its potential energy with the reverse movement thereof.

3. The foldable cockpit system as defined in claim 1, characterized in comprising at least one stand which is connected to the side construction in a moveable manner and ensures that the side construction is no longer in contact with the ground.

4. The foldable cockpit system as defined in claim 1, characterized in comprising a screw and nut allowing said clamp, which consists of two parts interconnected with at least one hinge, to present an entire ring by being connected.

5. The foldable cockpit system as defined in claim 1, characterized in comprising a buffer which gets between said clamp and chair leg while the former is being connected to the latter, thereby preventing any damage thereto.

6. The foldable cockpit system as defined in claim 1, characterized in comprising a telescopic arm which is engaged with said upper control interface arm telescopically, and thus adjusts the length thereof.

7. The foldable cockpit system as defined in claim 1, characterized in comprising a clamping screw which enables said telescopic arm to be secured on the upper control interface arm.

8. The foldable cockpit system as defined in claim 1, characterized in comprising an upper control interface panel on which said upper control interface is located.

9. The foldable cockpit system as defined in claim 1, characterized in comprising a neck enabling said upper control interface panel to be connected to the upper control interface arm or to the telescopic arm, in a moveable manner.

10. The foldable cockpit system as defined in claim 1, characterized in comprising a neck fixing screw which serves for fixing said neck.

11. The foldable cockpit system as defined in claim 1, characterized in comprising a connecting screw which permits said upper control interface to be connected to the upper control interface panel, and the lower control interface to the lower control interface arm.

12. The foldable cockpit system as defined in claim 1, characterized in comprising a fixing latch which fixes the positions of said lower control interface arm and lifting arm within the channel.

13. The foldable cockpit system as defined in claim 1, characterized in comprising a joint pin which is formed on said primary joint and fits in the channel in a way to allow the fixation thereof.

14. The foldable cockpit system as defined in claim 1, characterized in that said spring mechanism comprises:
   a spring which performs the functions including tensioning, storing and returning the potential energy, and
   a tensioning mechanism which mediates tensioning of said spring.

15. The foldable cockpit system as defined in claim 1, characterized in comprising a joint spring groove formed on said primary joint and serving for the fixation of the spring.

16. The foldable cockpit system as defined in claim 1, characterized in comprising a lock housing which is disposed on said primary beam and on which the locking mechanism is positioned.

17. The foldable cockpit system as defined in claim 1, characterized in comprising a linear tensioning guide which is formed on said primary beam and through which the tensioning arm passes in a way to move.

18. The foldable cockpit system as defined in claim 1, characterized in comprising a locking hole which is formed on said tensioning mechanism and through which the locking pin passes.

19. The foldable cockpit system as defined in claim 1, characterized in comprising dampers eliminating the requirement of using springs in said tensioning mechanism.

\* \* \* \* \*